US012518903B2

(12) United States Patent
Yamada

(10) Patent No.: US 12,518,903 B2
(45) Date of Patent: Jan. 6, 2026

(54) INDUCTOR COMPONENT AND MANUFACTURING METHOD THEREOF

(71) Applicant: Murata Manufacturing Co., Ltd., Kyoto-fu (JP)

(72) Inventor: Hiroki Yamada, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 802 days.

(21) Appl. No.: 17/837,563

(22) Filed: Jun. 10, 2022

(65) Prior Publication Data

US 2022/0399148 A1 Dec. 15, 2022

(30) Foreign Application Priority Data

Jun. 15, 2021 (JP) ................................. 2021-099355

(51) Int. Cl.

*H01F 17/00* (2006.01)
*H01F 27/29* (2006.01)
*H01F 27/32* (2006.01)
*H01F 41/04* (2006.01)

(52) U.S. Cl.

CPC ....... *H01F 17/0013* (2013.01); *H01F 27/292* (2013.01); *H01F 27/327* (2013.01); *H01F 41/041* (2013.01); *H01F 2017/0073* (2013.01)

(58) Field of Classification Search

CPC .. H01F 17/0013; H01F 27/292; H01F 27/327; H01F 41/041; H01F 2017/0073

See application file for complete search history.

(56) References Cited

U.S. PATENT DOCUMENTS

| | | | | |
|---|---|---|---|---|
| 2010/0201473 A1* | 8/2010 | Konoue | .................... | H01F 5/00 336/200 |
| 2011/0037557 A1* | 2/2011 | Konoue | .................. | H01F 27/34 336/200 |
| 2011/0115488 A1* | 5/2011 | Groeppel | ........... | G01R 33/3858 977/773 |
| 2015/0294780 A1* | 10/2015 | Maeda | ................ | H01F 27/2804 336/200 |
| 2019/0088414 A1* | 3/2019 | Oota | ..................... | H01F 41/041 |

(Continued)

FOREIGN PATENT DOCUMENTS

| | | |
|---|---|---|
| JP | 2002-305117 A | 10/2002 |
| JP | 2005-286111 A | 10/2005 |

(Continued)

*Primary Examiner* — Malcolm Barnes
(74) *Attorney, Agent, or Firm* — Studebaker Brackett PLLC

(57) ABSTRACT

An inductor component comprising a base body comprising a filler; a coil in the base body and helically wound along an axis; and external electrodes in the base body and each electrically connected to the coil, with outer faces of the external electrodes exposed from the base body. The base body comprises external electrode contact parts that each contact one of the external electrodes on an inner side of the base body and are each disposed along one of the external electrodes; and a central part that comprises a center point of the base body and is located away from the coil, the external electrodes, and the external electrode contact parts. A content rate of the filler in the external electrode contact parts is from a 0.9-fold level to a 1.1-fold level of a content rate of the filler in the central part.

3 Claims, 5 Drawing Sheets

(56) References Cited

U.S. PATENT DOCUMENTS

| | | | | |
|---|---|---|---|---|
| 2019/0189333 | A1* | 6/2019 | Kido | H01F 27/2804 |
| 2019/0311842 | A1* | 10/2019 | Imada | H01F 27/324 |

FOREIGN PATENT DOCUMENTS

| | | | | |
|---|---|---|---|---|
| JP | 2006-332236 | A | 12/2006 | |
| JP | 2007-109791 | A | 4/2007 | |
| JP | 2018-061008 | A | 4/2018 | |
| JP | 2018-131353 | A | 8/2018 | |
| JP | 2021-022611 | A | 2/2021 | |
| WO | 2007/080680 | A1 | 7/2007 | |
| WO | WO-2011148787 | A1 * | 12/2011 | H01F 17/0013 |
| WO | 2016/076024 | A1 | 5/2016 | |

* cited by examiner

INDUCTOR COMPONENT AND MANUFACTURING METHOD THEREOF

CROSS REFERENCE TO RELATED APPLICATION

This application claims benefit of priority to Japanese Patent Application 2021-099355, filed Jun. 15, 2021, the entire content of which is incorporated herein by reference.

BACKGROUND

Technical Field

The present disclosure relates to an inductor component and a manufacturing method thereof.

Background Art

An inductor component described in Japanese Laid-Open Patent Publication No. 2018-131353 has traditionally been present. This inductor component includes a base body, a coil that is disposed in the base body and that is spirally wound along an axis, and external electrodes that are disposed in the base body and that each are electrically connected to the coil. The base body includes a glass component to satisfy a low dielectric constant and a low dielectric loss and further includes a filler to improve the strength thereof.

WO2016-076024 describes that glass is added to a conductor paste to form a coil of an inductor component. WO2007-080680 describes that the same conductor paste is used in a coil and external electrodes to be simultaneously formed.

SUMMARY

Such a traditional inductor component as above was actually manufactured as below.

An insulating paste was prepared as the material of the base body and a conductor paste was prepared as the material of the coil and the material of the external electrodes. The insulating paste included a glass material and a filler. The conductor paste included a glass material and a conducting material. A layered body was thereafter formed by alternately laminating the insulating paste and the conductor paste on each other, and the layered body was baked to manufacture the inductor component. The glass material of the insulating paste was caused to include a filler to improve the strength, and the glass material of the conductor paste was caused to include no filler to smooth the surface shape of the coil and the external electrodes.

It however turned out that, as to the inductor component, the external electrodes might peel off from the base body. The inventor of the present application actively studied the peeling off of the external electrodes and found out the cause of the peeling off as below.

The inventor of the present application cut and observed the inductor component manufactured as above. FIG. 5 depicts a simplified cross-sectional diagram of the inductor component. As depicted in FIG. 5, a region (hereinafter, referred to as "external electrode contact part 201") of a base body 200, that contacted an external electrode 300 and that was present along the external electrode 300 was different from an other region 202 of the base body 200. In FIG. 5, for convenience, hatching of the base body 200 is not depicted.

As depicted in FIG. 6, an SEM image of a portion of FIG. 5 was acquired and an elemental analysis was conducted based on this SEM image. As a result, the other region 202 included a large amount of filler while the external electrode contact part 201 included almost no filler and included almost only the glass component. It turned out that the external electrode contact part 201 included no filler as above and therefore had poor strength and the external electrode 300 therefore might peel off from the base body 200 at the external electrode contact part 201.

The inventor of the present application found out the cause of the formation of the external electrode contact part that included no filler, as below.

When the conductor paste for the external electrode is baked, pieces of the conducting material (such as, for example, a metal powder) adjacent to each other develop local contraction (necking) to be baked to become metal parts. At this time, the glass material (such as, for example, a glass powder) is softened and flows among the metal parts to become a glass part. At this time, the softened glass part is pushed out to the outer side by the contraction of the conducting material and is moved to the outer circumferential edge of the external electrode that is a baked body of the conducting material, to become a part of the base body. The glass part pushed out to the outer circumferential edge of the external electrode as above includes no filler being different from the glass material included in the base body, and the external electrode contact part is formed by this glass part.

The present disclosure therefore provides an inductor component capable of reducing the peeling off of the external electrodes from the base body, and a manufacturing method thereof.

Accordingly, an inductor component that is an aspect of the present disclosure includes a base body that includes a filler; a coil that is disposed in the base body and that is helically wound along an axis; and external electrodes that are disposed in the base body, that are each electrically connected to the coil, and whose outer faces are exposed from the base body and, in the inductor component. The base body includes external electrode contact parts that each individually contact one of the external electrodes on the inner side of the base body and that are each individually disposed along one of the external electrodes; and a central part that includes the center point of the base body and that is located away from the coil, the external electrodes, and the external electrode contact parts. The content rate of the filler in the external electrode contact parts is equal to or larger than a 0.9-fold level and equal to or smaller than a 1.1-fold level (i.e., from a 0.9-fold level to a 1.1-fold level) of the content rate of the filler in the central part.

The content rate of the filler is the area of the filler per unit area in a cross-section of the base body. The central part of the base body refers to a part present within a radius of 10 μm from the center point of the base body. The center point is the point at a position that marks a half of each of the length, the width, and the height of the base body in the case where the base body is a cuboid.

According to the aspect, the content rate of the filler in the external electrode contact parts is substantially equal to the content rate of the filler in the central part. The strength of the external electrode contact parts on the peripheries of the external electrodes can therefore be improved and the peeling off of the external electrodes from the base body can therefore be reduced.

It is preferred that, in one embodiment of the inductor component, the base body further include a coil contact part that contacts the coil and that is disposed along the coil, and the content rate of the filler in the coil contact part be smaller than the content rate of the filler in the central part.

According to the embodiment, the coil contact part on the periphery of the coil is soft, that is, the softening point of the coil contact part is low. As to the behaviors of the conducting material and the glass material included in a conductor paste for coils, during the baking, the conducting material can therefore flexibly move in the softened glass material to be baked and, as a result, the surface shape of the coil that is a baked body of the conducting material becomes smooth. The electric resistance of the coil is therefore reduced at a high frequency and the Q-value can be improved.

It is preferred that, in one embodiment of the inductor component, the content rate of the filler in the external electrode contact parts be larger than the content rate of the filler in the coil contact part.

According to the embodiment, the peeling off of the external electrodes from the base body can be reduced by improving the strength of the external electrode contact parts and the surface shape of the coil can concurrently be made smooth by decreasing the softening point of the coil contact part.

It is preferred that, in one embodiment of the inductor component, the base body be a baked body. It is preferred that the base body include glass.

According to the embodiment, even when the inductor component is manufactured through the baking step, the content rate of the filler in the external electrode contact parts can be set to be substantially equal to the content rate of the filler in the central part, and the inductor component whose peeling off of the external electrodes from the base body can be reduced can be easily manufactured. Cracking or chipping may occur in the baked body due to an external force, and the improvement of the strength of the external electrode contact parts is therefore effectively exerted.

It is preferred that, in one embodiment of the inductor component, the filler be alumina.

According to the embodiment, in the case where the base body includes, for example, a glass component, the strength of the base body can further be improved because the bending strength of alumina is about a 10-fold level of the bending strength of the glass material.

It is preferred that, in one embodiment of the inductor component, the coil and the external electrodes each include silver.

According to the embodiment, because the electric resistivity of silver is low, the electric resistance of each of the coil and the external electrodes can be reduced and the electric power loss can be reduced.

It is preferred that one embodiment of the inductor component include a base body that includes a glass component and a filler; a coil that is disposed in the base body, that is helically wound along an axis, and that includes a glass component; and external electrodes that are disposed in the base body, that each are electrically connected to the coil, and whose outer faces are exposed from the base body and, in the inductor component. The base body includes a coil contact part that contacts the coil and that is disposed along the coil; and external electrode contact parts that each individually contact one of the external electrodes on the inner side of the base body and that each individually are disposed along one of the external electrodes. The content rate of the filler of the external electrode contact parts be equal to or larger than the content rate of the filler of the coil contact part, and the content rate of an Si element of the external electrode contact parts be smaller than the content rate of the Si element of the coil contact part.

The content rate of the filler is the area of the filler per unit area in a cross-section of the base body. The content rate of the Si element is the area of the Si element per unit area in a cross-section of the base body. The meaning of the expression "the content rate of the filler of the external electrode contact parts is equal to or larger than the content rate of the filler of the coil contact part" includes the fact that the content rate of the filler of the coil contact part is zero.

According to the embodiment, the content rate of the filler is large and the content rate of the Si element, that is, the glass component is small in the external electrode contact parts compared to those of the coil contact part, and the filler is present on the periphery of each of the external electrodes. The strength of the external electrode contact parts on the periphery of each of the external electrodes can therefor be improved and the peeling off of the external electrodes from the base body can be reduced.

It is preferred that, in one embodiment of the inductor component, the external electrodes include no glass component.

According to the embodiment, no glass component is present in the surface of each of the external electrodes and the adhesiveness of plating to each of the external electrodes can therefore be further improved when the plating is applied to each of the external electrodes.

It is preferred that one embodiment of a manufacturing method for an inductor component include the steps of preparing an insulating paste that includes a glass material and a filler, as the material of a base body, preparing a conductive paste for coils, that includes a glass material and a conductive material, as the material of a coil, and preparing a conductive paste for external electrodes, that includes at least a conductive material of a glass material and the conductive material, as the material of external electrodes. The manufacturing method also includes forming a layered body by alternately laminating the insulating paste, the conductive paste for coils, and the conductive paste for external electrodes on each other; and baking the layered body and, in the manufacturing method for an inductor component. The content rate of the glass material of the conductive paste for external electrodes be smaller than the content rate of the glass material of the conductive paste for coils.

According to the embodiment, when the conductor paste for external electrodes is baked, pieces of the conducting material (such as, for example, a metal powder) adjacent to each other develop local contraction to be baked to become metal parts. At this time, the glass material (such as, for example, a glass powder) is softened and flows among the metal parts to become a glass part. At this time, the softened glass part is pushed out to the outer side by the contraction of the conducting material and is moved on the outer circumferential edges of the external electrodes that each are a baked body of the conducting material, to become parts of the base body. The external electrode contact parts are formed by the glass part pushed out to the outer circumferential edge of each of the external electrodes as above. The meaning of the expression "the content rate of the glass material of the conductor paste for external electrodes is smaller than the content rate of the glass material of the conductor paste for coils" includes the case where the content rate of the glass material of the conductor paste for external electrodes is zero. The glass material included in the conductor paste for external electrodes is a little or zero, and the strength of each of the external electrode contact parts can therefore be improved and the peeling off of the external electrodes from the base body can be reduced by reducing the pushing out of the glass material to the external electrode contact parts on the peripheries of the external electrodes. The content rate of the glass material in a paste is the rate of the weight (% by weight) of the glass material mixed in the paste to the overall weight of the paste.

According to the inductor component and the manufacturing method thereof that are one aspect of the present disclosure, the peeling off of the external electrodes from the base body can be reduced.

DETAILED DESCRIPTION

Figure 1:
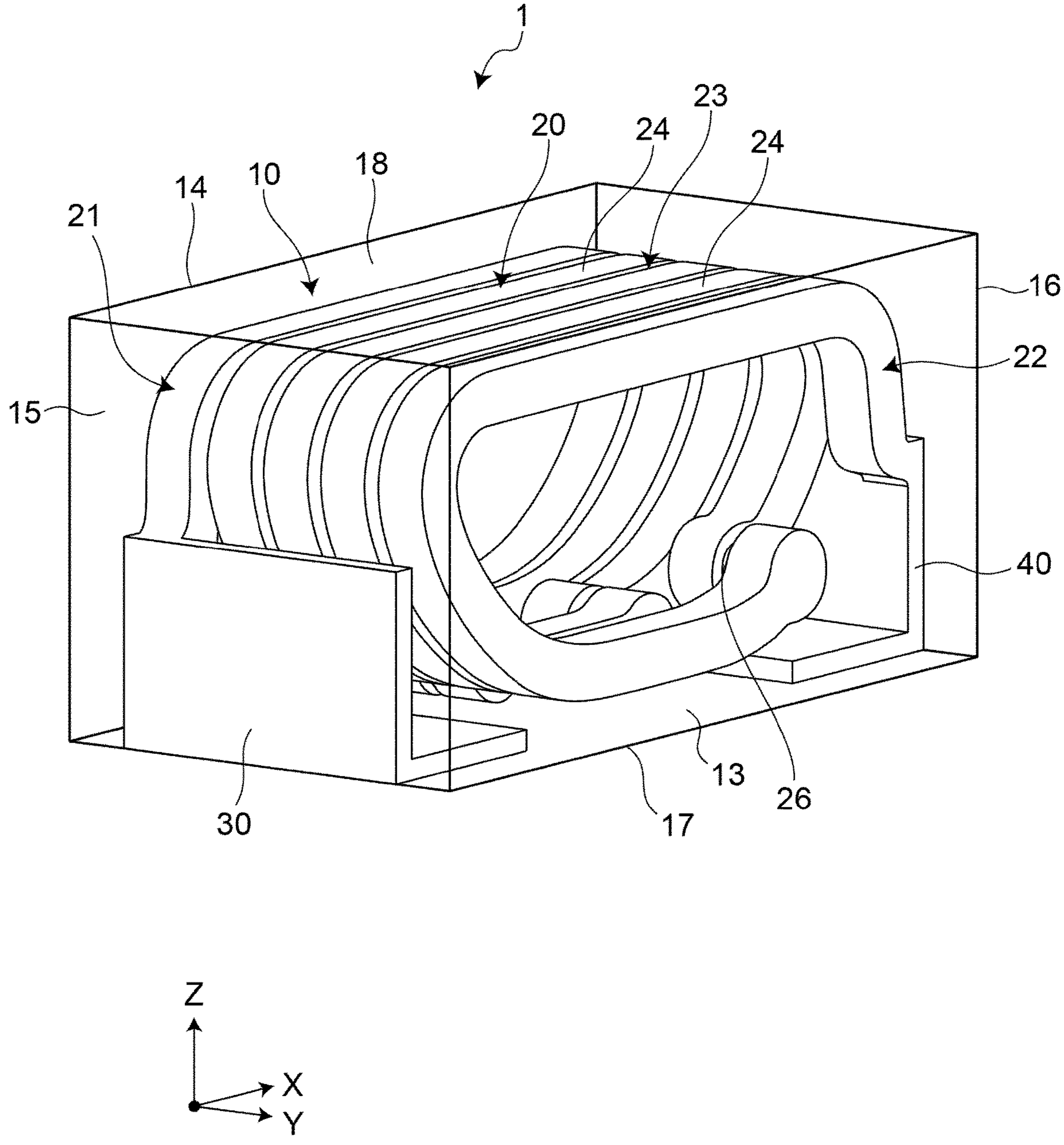
FIG. 1 is a see-through perspective diagram depicting a first embodiment of an inductor component.

An inductor component that is one aspect of the present disclosure will be described below in detail with reference to embodiments depicted in the drawings. The drawings may partially include schematic diagrams and may not reflect the actual dimensions and proportions.

First Embodiment

<Configuration of Inductor Component>

Figure 2:
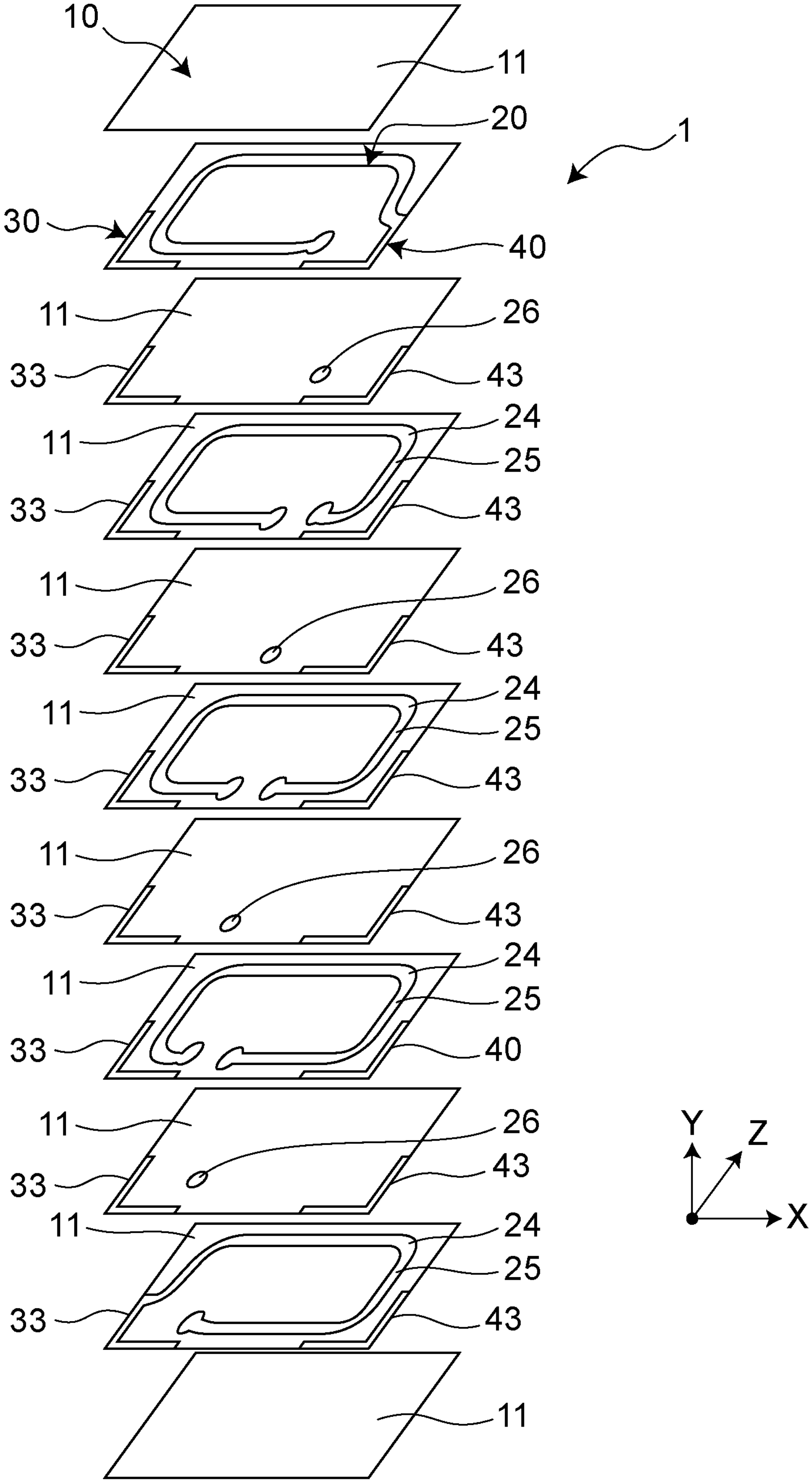
FIG. 2 is an exploded perspective diagram of the inductor component.

FIG. 1 is a see-through perspective diagram depicting a first embodiment of an inductor component. FIG. 2 is an exploded perspective diagram of the inductor component. As depicted in FIG. 1 and FIG. 2, the inductor component 1 includes a base body 10, a coil 20 that is disposed in the base body 10 and that is spirally wound along an axis, and a first external electrode 30 and a second external electrode 40 that are disposed in the base body 10, that are each electrically connected to the coil 20, and whose outer faces are disposed from the base body 10. In FIG. 1, the base body 10 is depicted to be transparent for the structure thereof to be easily understood while the base body 10 may be translucent or opaque.

The inductor component 1 is electrically connected to wires of a mounting substrate not depicted through the first and the second external electrodes 30 and 40. The inductor component 1 is used as, for example, a coil for impedance matching (a matching coil) of a high-frequency circuit, and is used in each of electronic devices such as a personal computer, a DVD player, a digital camera, a TV, a mobile phone, car electronics, medical machines, and industrial machines. The uses of the inductor component 1 are however not limited to the above and the inductor component 1 is also usable in each of, for example, a tuning circuit, a filter circuit, and a rectifying and smoothing circuit.

The base body 10 has a length, a width, and a height, and has a cuboid shape whose length is longer than the width and the height thereof. As depicted, an X-direction is a length direction of the base body 10, a Y-direction is a width direction of the base body 10, and a Z-direction is a height direction of the base body 10. The X-direction, the Y-direction, and the Z-direction intersect each other each at a right angle. The surface of the base body 10 includes a first end face 15 and a second end face 16 that are present on both end sides in the length direction, a first side face 13 and a second side face 14 that are present on both end sides in the width direction, and a bottom face 17 and a top face 18 that are present on both end sides in the height direction. The bottom face 17 is the face on which the first and the second external electrodes 30 and 40 are both exposed, the first end face 15 is the face on which only the first external electrode 30 is exposed, and the second end face 16 is the face on which only the second external electrode 40 is exposed. The length, the width, and the height of the base body 10 can be defined based on the exposure positions of the first and the second external electrodes 30 and 40.

The base body 10 is configured by laminating plural insulating layers 11. The laminating direction of the insulating layers 11 is the direction (the Y-direction) that is parallel to the first and the second end faces 15 and 16 and the bottom face 17. The insulating layers 11 each have a layer-like shape having its principal surface that spreads in the XZ-plane. To be "parallel" as used in the present application is not limited to a strict parallel relation and includes a substantially parallel relation taking into consideration the range of the realistic dispersion. For the base body 10, the interfaces among the plural insulating layers 11 may be unclear due to the baking or the like.

The base body 10 includes glass and a filler. For example, the insulating layer 11 includes a material whose main component is borosilicate glass. For example, the insulating layer 11 includes a base material that includes an amorphous material including B, Si, O, and K, and a crystalline filler. When the base body 10 includes the crystalline filler, the base body 10 can suppress occurrence of a crack due to an impact caused when the inductor component is mounted or a stress caused when the mounting substrate is warped. The strength of the inductor component 1 can be enhanced.

The amorphous material including B, Si, O, and K is, for example, borosilicate glass that includes B, Si, O, and K. In addition to the borosilicate glass, the amorphous material may include glass that includes, for example, $SiO_2$, $B_2O_3$, $K_2O$, $Li_2O$, CaO, ZnO, $Bi_2O_3$, and/or $Al_2O_3$, such as, for example, $SiO_2$—$B_2O_3$—$K_2O$-based glass, $SiO_2$—$B_2O_3$—$Li_2O$—Ca-based glass, $SiO_2$—$B_2O_3$—$Li_2O$—CaO—ZnO-based glass, or $Bi_2O_3$—$B_2O_3$—$SiO_2$—$Al_2O_3$-based glass.

It is preferred that the crystalline filler include any of, for example, Al, Si, Ti, Zr, Ca, Mg, Fe and Mn. When the crystalline filler includes any of the above elements, the strength of the inductor component 1 can further be improved.

The coil 20 includes a conducting material such as an alloy whose main component is, for example, Ag, Cu, Au or these. The coil 20 is spirally wound along the lamination direction of the insulating layers 11. A first end of the coil 20 is connected to the first external electrode 30, and a second end of the coil 20 is connected to the second external electrode 40. In this embodiment, the coil 20 and the first and the second external electrodes 30 and 40 are integrated with each other, and no clear border is present thereamong while the configuration thereof is not limited to the above and borders may be present thereamong by forming the coil and the external electrodes using other types of material or another type of crafting method.

The coil 20 is wound along an axis such that the axis becomes parallel to the width direction of the base body 10. The axis of the coil 20 matches with the lamination direction (the Y-direction) of the insulating layers 11. The axis of the coil 20 means the central axis of the spiral shape of the coil 20.

The coil 20 includes a winding part 23, a first lead part 21 that is connected to a point between a first end of the winding part 23 and the first external electrode 30, and a second lead part 22 that is connected to a point between a second end of the winding part 23 and the second external electrode 40. In this embodiment, the winding part 23 and the first and the second lead parts 21 and 22 are integrated with each other and no clear border is present thereamong while the configuration thereof is not limited to the above and borders may be present thereamong by forming the winding part and the lead parts using other types of material or another type of crafting method.

The winding part 23 is spirally wound along the axis. The winding part 23 refers to a spirally wound part that overlaps when the winding part 23 is seen from a direction that is parallel to the axis. The first and the second lead parts 21 and 22 refer to parts present outside the part that overlaps. The winding part 23 is formed in a substantial rectangle when the winding part 23 is seen from the axis direction while the shape thereof is not limited to this shape. The shape of the winding part 23 may be, for example, a circular shape, an elliptic shape, or a polygonal shape other than a rectangle. The first lead part 21 refers to a part that is present outside the winding part 23, that is, the above overlapping and spirally wound part, and that is connected to the first external electrode 30. The second lead part 22 similarly refers to the part that is present outside the winding part 23 and that is connected to the second external electrode 40.

The coil 20 includes plural coil wires 24 that are laminated along the axis, via wires 26 that each extend along the axis and that each connect the coil wires 24 adjacent to each other in the axis direction, to each other. The plural coil wires 24 are each wound along a plane and are electrically connected to each other in series to configure a spiral.

The coil wires 24 are each individually formed by being wound on the principal surface (the XZ-plane) of one of the insulating layers 11 that intersect the axis direction at right angles. The number of turns of the coil wire 24 is smaller than one round while the number of turns thereof may be one round or larger. The via wire 26 penetrates the insulating layer 11 in the thickness direction thereof (the Y-direction). The coil wires 24 adjacent to each other in the lamination direction are electrically connected to each other in series through the via wire 26. In this manner, the plural coil wires 24 are electrically connected to each other in series to configure the spiral. The coil wire 24 includes a one-layer coil conductor layer 25. The coil wire 24 may include the plural coil conductor layers 25 that each have surface-contact with each other.

The first external electrode 30 and the second external electrode 40 each include, for example, the conducting material same as that of the coil 20. The first external electrode 30 is disposed continuously from the first end face 15 and the bottom face 17. The first external electrode 30 is buried in the base body 10 to be exposed from the first end face 15 and the bottom face 17. The second external electrode 40 is disposed continuously from the second end face 16 and the bottom face 17. The second external electrode 40 is buried in the base body 10 to be exposed from the second end face 16 and the bottom face 17.

The first external electrode 30 and the second external electrode 40 have configurations respectively for plural first external electrode conductor layers 33 and plural second external electrode conductor layers 43 that are buried in the base body 10 (the insulating layers 11) to be laminated on each other. The external electrode conductor layers 33 each extend along the first end face 15 and the bottom face 17, and the external electrode conducting layers 43 each extend along the second end face 16 and the bottom face 17. The external electrodes 30 and 40 can thereby be buried in the base body 10, and downsizing of the inductor component or an increase of the volume of the base body 10 in the same mounting area can therefore be facilitated compared to a configuration for the external electrodes to be externally attached to the base body 10. The coil 20 and the external electrodes 30 and 40 can be formed at the same one step and the dispersion in the positional relation between the coil 20 and the external electrodes 30 and 40 can thereby be reduced, and the dispersion in the electric properties of the inductor component 1 can be reduced. In the first external electrode 30 and the second external electrode 40, the first external electrode conductor layers 33 are and the second external electrode conductor layers 43 are connected to each other by via wires not depicted.

Figure 3:
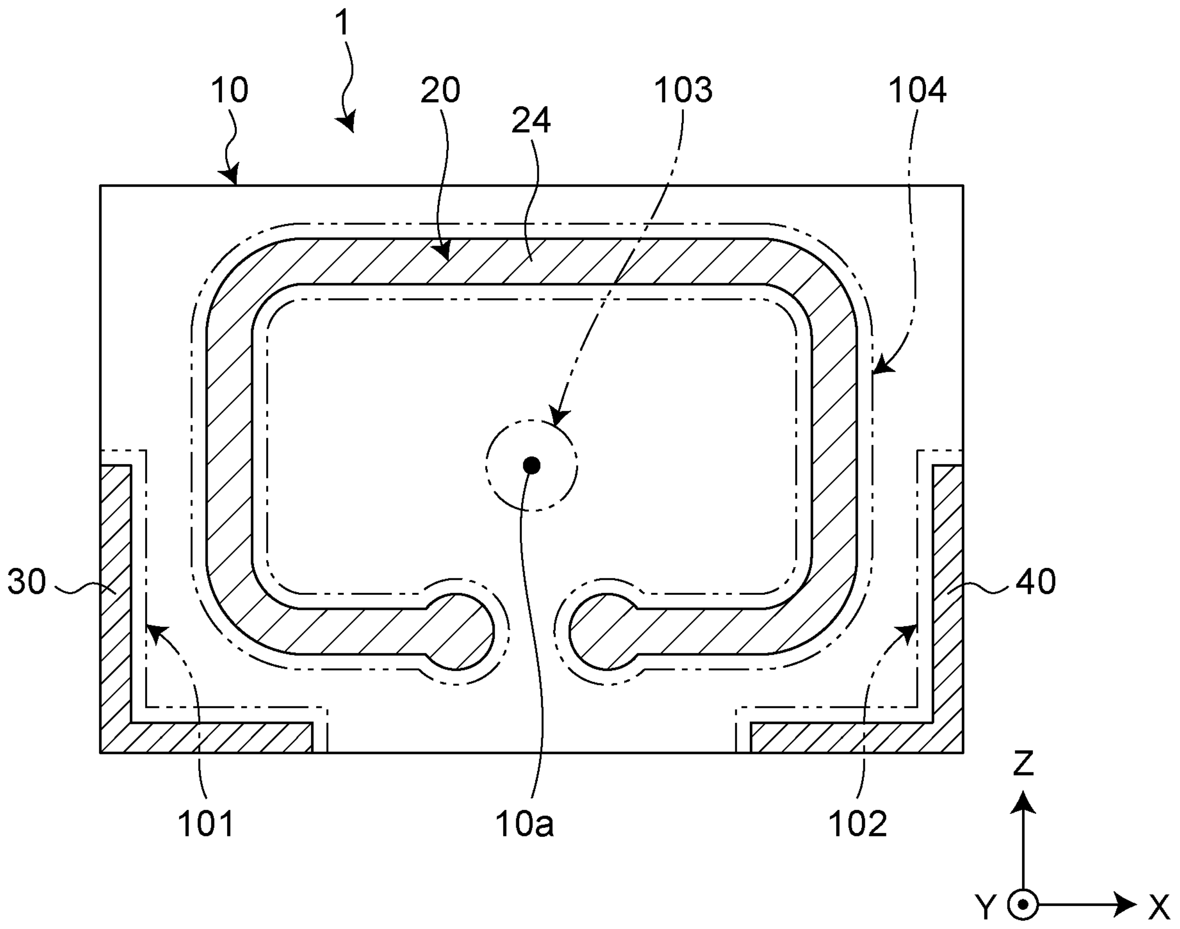
FIG. 3 is a cross-sectional diagram of the inductor component.

FIG. 3 is an XZ-cross-sectional diagram including a center point 10*a* of the base body 10 of the inductor component 1. In FIG. 3, for convenience, hatching of the base body 10 is not depicted. As depicted in FIG. 3, the base body 10 includes a first external electrode contact part 101, a second external electrode contact part 102, and the central part 103.

The first external electrode contact part 101 is disposed along the first external electrode 30 contacting the first external electrode 30 on the inner side of the base body 10. The second external electrode contact part 102 is disposed along the second external electrode 40 contacting the second external electrode 40 on the inner side of the base body 10.

The central part 103 includes the center point 10*a* of the base body 10, and is isolated from the coil 20, the first and the second external electrodes 30 and 40, and the first and the second external electrode contact parts 101 and 102. The central part 103 of the base body 10 refers to a part present within a radius of 10 μm from the center point 10*a* of the base body 10. The center point 10*a* is the point marks a half in each of the X-direction, the Y-direction, and the Z-direction of the base body 10.

The content rate of the filler in the first external electrode contact part 101 is equal to or larger than a 0.9-fold level and equal to or smaller than a 1.1-fold level (i.e., from a 0.9-fold level to a 1.1-fold level) of the content rate of the filler in the central part 103. The content rate of the filler in the second external electrode contact part 102 is equal to or larger than a 0.9-fold level and equal to or smaller than a 1.1-fold level (i.e., from a 0.9-fold level to a 1.1-fold level) of the content rate of the filler in the central part 103.

The content rate of the filler is calculated as below. An SEM image of a cross-section that passes through the center point 10*a* of the base body 10 and that is parallel to the XZ-plane is acquired and an elemental analysis is conducted based on the SEM image to determine the content rate of the filler. For example, from the SEM image, the area in which an element to be the component specific to the filler, per unit area in the central part 103 is mapped is acquired and, similarly, the area of the filler, per unit area in the first external electrode contact part 101 is acquired, and the area of the filler, per unit area in the second external electrode contact part 102 is acquired. Determination of the content rate of an Si element is similarly executed as above. For example, in the above, the area in which the Si element is mapped only has to be acquired.

Even the cross-section that passes through the center point 10*a* of the base body 10 and that is parallel to the XZ-plane, may pass, for example, between the adjacent layers of the first external electrode conductor layers 33 and may not intersect the first external electrode conductor layer 33 itself. In this case, the content rate of the filler in the first external electrode contact part 101 is measured in the cross-section that is the XZ-cross-section in the vicinity of the above cross-section and that intersects the first external electrode conductor layer 33. Measurement of the content rate of the filler in the second external electrode conduct part 102 is similarly conducted.

According to the above configuration, the content rates of the filler in the first and the second external electrode contact parts 101 and 102 are each substantially equal to the content rate of the filler in the central part 103. The strength of each of the first and the second external electrode contact parts 101 and 102 on the peripheries of the first and the second external electrodes 30 and 40 can therefore be improved, and the peeling off of the first and the second external electrodes 30 and 40 from the base body 10 can therefore be reduced.

Because the filler content rates of the first and the second external electrode contact parts 101 and 102 are each substantially equal to the filler content rate of the central part 103, the material of the first and the second external electrode contact parts 101 and 102 and the material of the central part 103 may be substantially same as each other. In this case, the first and the second external electrode contact parts 101 and 102 may not be distinguished from other regions (such as, especially, the regions in the vicinities of the first and the second external electrode contact parts 101 and 102) of the base body 10, being different from the traditional external electrode contact parts.

Taking into consideration also the case where the first and the second external electrode contact parts 101 and 102 cannot be distinguished from the other regions of the base body 10 as above, the first external electrode contact part 101 is set to be a region ranging over at least 5 μm from the first external electrode 30, and the second external electrode contact part 102 is set to be a region ranging over at least 5 μm from the second external electrode 40. The content rate of the filler of the first external electrode contact part 101 or the second external electrode contact part 102 may be equal to or larger than a 0.9-fold level and equal to or smaller than a 1.1-fold level (i.e., from a 0.9-fold level to a 1.1-fold level) of the content rate of the filler of the central part 103.

It is preferred that the base body 10 further include a coil contact part 104. The coil contact part 104 is disposed along the coil 20 contacting the coil 20. The coil contact part 104 is disposed along the outer face of each of the coil wires 24 to cover the outer face of each of the coil wires 24. The content rate of the filler in the coil contact part 104 is smaller than the content rate of the filler in the central part 103.

According to the above configuration, the coil contact part 104 on the periphery of the coil 20 is soft, that is, the softening point of the coil contact part 104 is low. With relation to the behaviors of the conducting material and the glass material included in a conductor paste for coils, during the baking, the conducting material can therefore flexibly move in the softened glass material to be baked and, as a result, the surface shape of the coil 20 that is a baked body of the conducting material becomes smooth. The electric resistance of the coil 20 is therefore reduced at a high frequency and the Q-value can be improved.

The filler content rate of the coil contact part 104 may be substantially equal to the filler content rate of the central part 103 and, in this case, the coil contact part 104 may not be distinguished from the other regions (such as, especially, the region in the vicinity of the coil contact part 104) of the base body 10. Taking also into consideration the above case, the coil contact part 104 is set to be a region ranging over at least 2 μm from the coil 20. It is preferred that the content rate of the filler in the first external electrode contact part 101 be larger than the content rate of the filler in the coil contact part 104. It is also preferred that the content rate of the filler in the second external electrode contact part 102 be larger than the content rate of the filler in the coil contact part 104.

According to the above configuration, the strength of each of the first and the second external electrode contact parts 101 and 102 can be improved and the peeling off of the first and the second external electrodes 30 and 40 from the base body 10 can thereby be reduced, and the surface shape of the coil 20 can be made smooth by decreasing the softening point of the coil contact part 104.

The content rate of the filler of the first external electrode contact part 101 or the second external electrode contact part 102 may be larger than the content rate of the filler of the coil contact part 104.

It is preferred that the base body 10 be a baked body. According to the above configuration, even when the inductor component 1 is manufactured through a baking step, the content rate of the filler in each of the first and the second external electrode contact parts 101 and 102 can be set to be substantially equal to the content rate of the filler in the central part 103, and the inductor component 1 whose peeling off of the first and the second external electrodes 30 and 40 from the base body 10 can be reduced can easily be manufactured. Because cracking or chipping may occur in a baked body due to an external force, the improvement of the strength of each of the first and the second external electrode contact parts 101 and 102 is effectively exerted.

The base body 10 may be a resin. In this case, the content rate of the filler of the external electrode contact parts only has to be set to be equal to the content rate of the filler of the central part in some way. For example, after external electrodes are formed on a glass body and these components are baked, the glass body is scraped by etching to cut off the external electrodes and the external electrodes may thereafter be hardened with a resin.

It is preferred that the filler be alumina. According to the above configuration, in the case where the base body 10 includes, for example, a glass component, the strength of the base body 10 can further be improved because the bending strength of alumina is about a 10-fold level of the bending strength of the glass material.

It is preferred that the coil 20, and the first and the second external electrodes 30 and 40 each include silver. According to the above configuration, the electric resistance of each of the coil 20, and the first and the second external electrodes 30 and 40 can be reduced because the electric resistivity of silver is low, and the electric power loss can be reduced.

<Manufacturing Method for Inductor Component>

A manufacturing method for the inductor component 1 will next be described.

An insulating paste including a glass material and a filler is first prepared as the material of the base body 10. A conductor paste for coils that includes a glass material and a conducting material is prepared as the material of the coil 20. A conductor paste for external electrodes that includes at least a conducting material of a glass material and the conducting material is prepared as the material of the first and the second external electrodes 30 and 40. The conductor paste for external electrodes is used, whose content rate of the glass material is smaller than the content rate of the glass material of the conductor paste for coils.

The insulating paste, the conductor paste for coils, and the conductor paste for external electrodes are thereafter alternately laminated on each other to form a layered body, and the layered body is baked.

When the conductor paste for external electrodes is baked, pieces of the conducting material (such as, for example, a metal powder) adjacent to each other develop local contraction to be baked to become a metal part. At this time, the glass material (such as, for example, a glass powder) is softened and flows among the metal parts to become a glass part. At this time, the softened glass part is pushed out to the outer side by the contraction of the conducting material and is moved to the outer circumferential edge of the external electrodes 30 and 40 that each are a baked body of the conducting material, to become a part of the base body 10. The external electrode contact parts 101 and 102 are formed by the glass parts pushed out to the outer circumferential edge of the external electrodes 30 and 40 as above. The formation of the coil contact part 104 is same as above.

The content rate of the filler of each of the external electrode contact parts 101 and 102 can therefore be set to be close to the content rate of the filler of the central part 103 compared to the content rate of the filler of the coil contact part 104, by reducing the pushing of the glass material to the external electrode contact parts 101 and 102 on the peripheries of the external electrodes 30 and 40 because the glass material included in the conductor paste for external electrodes is a little or zero. For example, the content rate of the filler of each of the external electrode contact parts 101 and 102 can be set to be substantially equal to the content rate of the filler of the central part 103. As a result, the strength of each of the external electrode contact parts 101 and 102 can be improved and the peeling off of the external electrodes 30 and 40 from the base body 10 can be reduced.

It is preferred that, at the preparation step, the content rate of the glass material of the conductor paste for external electrodes be adjusted such that the content rate of the filler of the first and the second external electrode contact parts 101 and 102 is equal to or larger than a 0.9-fold level and equal to or smaller than a 1.1-fold level (i.e., from a 0.9-fold level to a 1.1-fold level) relative to the content rate of the filler of the central part 103.

At the preparation step, instead of setting the content rate of the glass material of the conductor paste for external electrodes to be smaller than the content rate of the glass material of the conductor paste for coils, the content rate of the filler of the conductor paste for external electrodes may be set to be larger than the content rate of the filler of the conductor paste for coils. Even in this case, the content rate of the filler of the external electrode contact parts 101 and 102 can be set to be close to the content rate of the filler of the central part 103 compared to the content rate of the filler of the coil contact part 104 and, as a result, the strength of each of the external electrode contact parts 101 and 102 can be improved and the peeling off of the external electrodes 30 and 40 from the base body 10 can be reduced.

Second Embodiment

Figure 4:
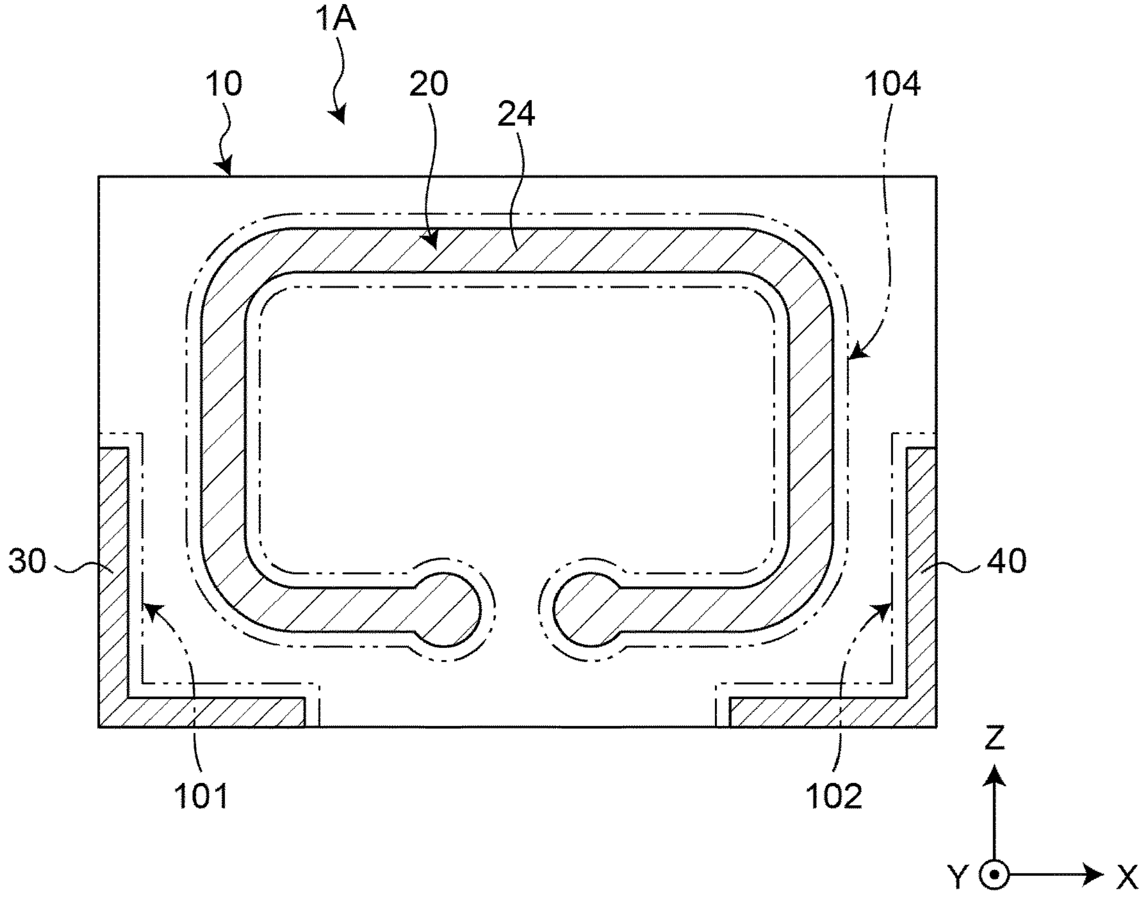
FIG. 4 is a cross-sectional diagram depicting a second embodiment of the inductor component.
Figure 5:
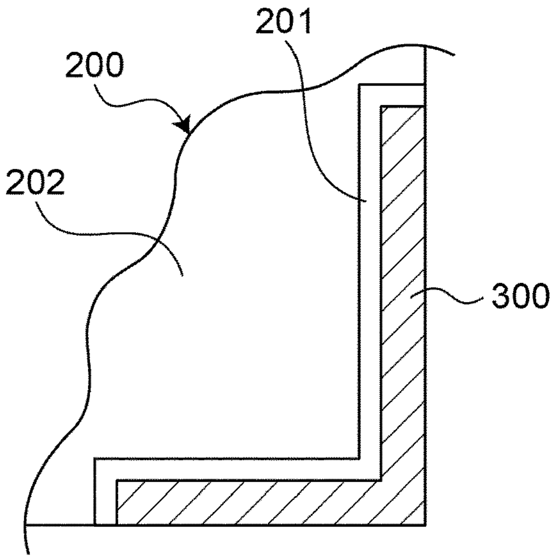
FIG. 5 is a simplified cross-sectional diagram of a traditional inductor component.
Figure 6:
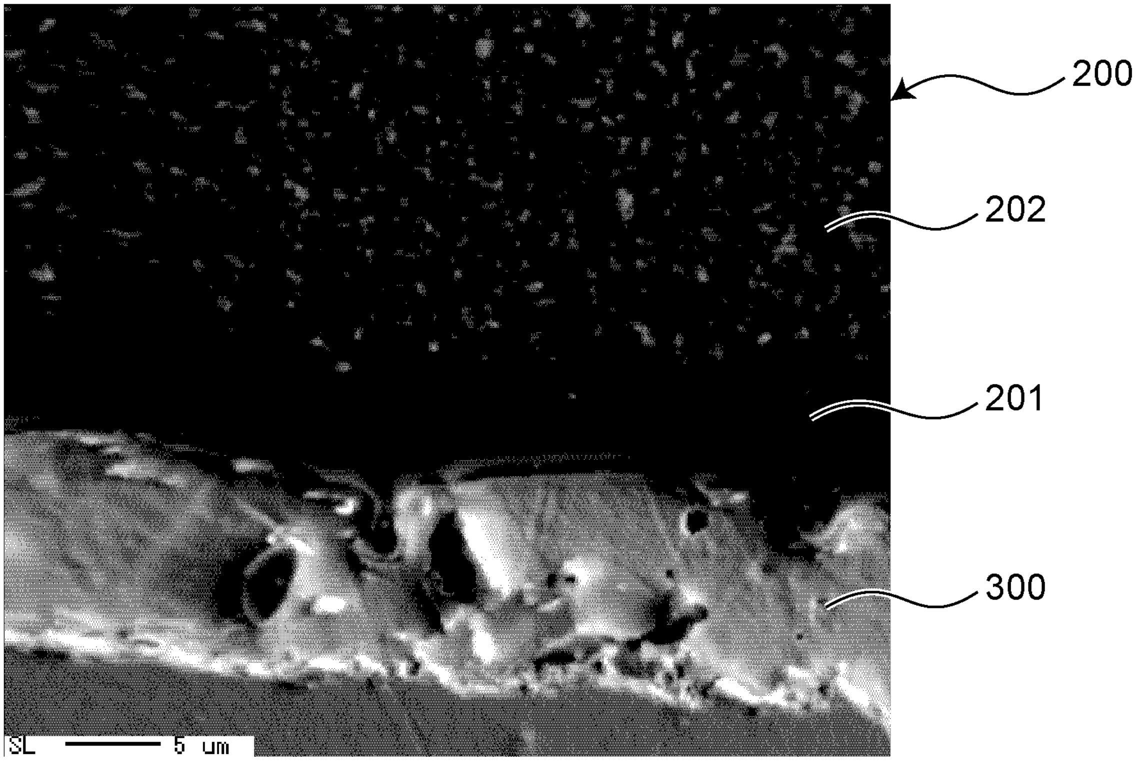
FIG. 6 is an image diagram of the traditional inductor component.

FIG. 4 is a cross-sectional diagram taken in parallel to the XZ-plane and depicting a second embodiment of the inductor component. In the first embodiment, the filler content rate of the external electrode contact parts and the filler content rate of the central part are compared to each other while, in the second embodiment, the filler content rate of the external electrode contact parts and the filler content rate of the coil contact part are compared to each other and the Si element content rate as the glass component content rate of the external electrode contact parts and the Si element content rate as the glass component content rate of the coil contact part are compared to each other. In the second embodiment, the other configurations other than the points different from the first embodiment are the same configurations as those of the first embodiment otherwise especially described, and will not again be described.

As depicted in FIG. 4, as to an inductor component 1A of the second embodiment, the content rates of the filler of the first and the second external electrode contact parts 101 and 102 are each equal to or larger than the content rate of the filler of the coil contact part 104. The content rates of the Si element of the first and the second external electrode contact parts 101 and 102 are each smaller than the content rates of the Si element of the coil contact part 104. The content rates of the filler and the content rates of the Si element are calculated by the measuring method described in the first embodiment.

According to the above configuration, in the first and the second external electrode contact parts 101 and 102, the content rates of the filler are large and the content rates of the Si element, that is, the glass component are small, compared to those of the coil contact part 104, and the filler is therefore present on the peripheries of the first and the second external electrodes 30 and 40. The strength of each of the first and the second external electrode contact parts 101 and 102 on the peripheries of the first and second external electrodes 30 and 40 can therefore be improved and the peeling off of the first and the second external electrodes 30 and 40 from the base body 10 can be reduced.

The content rate of the filler of the first external electrode contact part 101 or the second external electrode contact part 102 may be larger than the content rate of the filler of the coil contact part 104. The content rate of the Si element of the first external electrode contact part 101 or the second external electrode contact part 102 may be smaller than the content rate of the Si element of the coil contact part 104.

It is preferred that the first and the second external electrodes 30 and 40 each include no glass component. According to the above configuration, because no glass component is present in the surface of each of the first and the second external electrodes 30 and 40, the adhesiveness of plating to each of the first and the second external electrodes 30 and 40 can further be improved when the plating is applied to each of the first and the second external electrodes 30 and 40. For example, due to the inclusion of no glass material in the conductor paste for external electrodes, during the baking, no flowing of the glass material occurs into the first and the second external electrode contact parts 101 and 102 that are disposed respectively along the first and the second external electrodes 30 and 40 and that respectively contact the first and the second external electrodes 30 and 40 each on the inner side of the base body 10, and the strength of each of the first and the second external electrode contact parts 101 and 102 can be set to be equal to that of each of the other regions of the base body 10 (except the coil contact part 104).

The present disclosure is not limited to the above embodiments, and design changes can be made thereto within the scope not departing from the gist of the present disclosure. For example, the feature points of each of the first and the second embodiments may variously be combined. For example, the number of the coils and the number of the external electrodes may each be increased, and the number of the coil wires constituting the coil may be increased or decreased.

The axis of the coil intersects the side face of the base body at a right angle in the first and the second embodiments while the axis may intersect the end face of the base body at a right angle or may intersect the bottom face of the base body at a right angle.

The external electrodes are each disposed continuously from the end face and the bottom face of the base body in the first and the second embodiments while the external electrodes may each be disposed only on the end face or the bottom face of the base body, or may each be disposed continuously from the end face, the bottom face, and the top face of the base body.

The number of the external electrodes may be one, or three or more in the first embodiment. In the case where three or more external electrodes are present, that is, in the case where three or more external electrode contact parts are present, the content rate of the filler of at least one external electrode contact part may be equal to or larger than a 0.9-fold level and equal to or smaller than a 1.1-fold level (i.e., from a 0.9-fold level to a 1.1-fold level) relative to the content rate of the filler of the central part. The content rate of the filler of at least one external electrode contact part may be larger than the content rate of the filler of the coil contact part.

The number of the external electrodes may be one, or three or more in the second embodiment. In the case where three or more external electrodes are present, that is, in the case where three or more external electrode contact parts are present, the content rate of the filler of at least one external electrode contact part may be larger than the content rate of the filler of the coil contact part. The content rate of the Si element of at least one external electrode contact part may be smaller than the content rate of the Si element of the coil contact part.

EXAMPLE

Example of the manufacturing method for the inductor component 1 will be described below.

An insulating paste whose main component is a borosilicate glass is applied by screen printing onto a base material such as a carrier film and this step is repeated to form insulating layers. These insulating layers become insulating layers for outer layers, each positioned on the outer side of a coil conductor layer. The base material is peeled off from the insulating layer at an optional step and does not remain in the state of the inductor component.

A photosensitive conductor paste is thereafter formed by application on the insulating layer, and the coil conductor layer and an external electrode conductor layer are formed by a photolithography step. For example, a photosensitive conductor paste whose metal main component is Ag is applied by screen printing onto the insulating layer to form a photosensitive conductor paste layer. A UV ray or the like is applied to the photosensitive conductor paste layer through a photomask and the photosensitive conductor paste layer is developed using an alkali solution or the like. The coil conductor layer and the external electrode conductor layer are thereby formed on the insulating layer. At this time, the coil conductor layer and the external electrode conductor layer each can thereby depict a desired pattern therein by the photomask.

A photosensitive insulating paste layer is formed by application on the insulating layer to form an insulating layer having an opening and a via hole disposed therein, by a photolithography step. For example, a photosensitive insulating paste is applied onto the insulating layer by screen printing to form a photosensitive insulating paste layer. A UV ray or the like is applied to the photosensitive insulating paste layer through a photomask and the photosensitive insulating paste layer is developed using an alkali solution or the like. At this time, the photosensitive insulating paste layer is patterned by the photomask such that an opening is disposed above the external electrode conductor layer and a via hole is disposed in an end portion of the coil conductor layer.

A photosensitive conductor paste layer is thereafter formed by application on the insulating layer having the opening and the via hole disposed therein and the coil conductor layer and the external electrode conductor layer are formed by a photolithography step. For example, a photosensitive conductor paste whose metal main component is Ag is applied onto the insulating layer by screen printing to bury the opening and the via hole, to form the photosensitive conductor paste layer. A UV ray or the like is applied to the photosensitive conductor paste layer through a photomask and the photosensitive conductor paste layer is developed using an alkali solution or the like. An external electrode conductor layer connected to the external electrode conductor layer on the lower layer side through the opening, and a coil conductor layer connected to the coil conductor layer on the lower layer side through the via hole are thereby formed on the insulting layer.

The coil including the coil conductor layers formed on the plural insulating layers, and the external electrodes each including the external electrode conductor layers formed on the plural insulating layers are formed by repeating the above step of forming the insulating layer, the coil conductor layer, and the external electrode conductor layer. The insulating paste is applied by screen printing onto the insulating layer having the coil and the external electrodes formed thereon and this step is repeated to form the insulating layers. The insulating layers become insulting layers for outer layers that are positioned on the outer side of the coil conductor layers. When combinations each of the coil and the external electrodes are formed in a matrix on the insulating layers at the above steps, a mother layered body can be acquired.

The mother layered body is thereafter cut by dicing or the like into plural unbaked layered bodies. At the mother layered body cutting step, the external electrodes are exposed from the mother layered body on the cutting surfaces formed by the cutting. At this time, when a cutting deviation by a specific amount or larger occurs, the outer circumferential edge of the coil conductor layer formed at the above steps appears on the end face or the bottom face.

The unfinished layered body is baked under predetermined conditions to acquire the base body that includes the coil and the external electrodes. A barrel process is applied to this base body to polish the base body into a proper outer shape size, and Ni plating having a thickness of 2 μm to 10 μm and Sn plating having a thickness of 2 μm to 10 μm are applied to the portions in which the external electrodes are exposed from the layered body. The inductor component of 0.4 mm×0.2 mm×0.2 mm is completed through the above steps.

The forming method for the conductor pattern is not limited to the above and may be, for example, a printing lamination method for the conductor paste by a screen plate that has an opening in the shape of the conductor pattern, may be a method of forming a pattern by etching a conductor film that is formed by a sputtering method, a vapor deposition method, a pressure bonding of a foil, or the like, or may be, like a semi-additive method, a method of forming a negative pattern and forming a conductor pattern using a plating film and thereafter removing the unnecessary portions. A loss caused by the resistance at a high frequency can be reduced by establishing a high aspect by forming the conductor pattern in a multi-stage structure. For example, the forming method for the conductor pattern may be a process of repeating the formation of the above conductor pattern, may be a process of repeatedly overlaying a wire formed by a semi-additive process, may be a process of forming a part of the lamination using the semi-additive process and forming another part by etching a film grown by plating, or may be combining a process of further growing by plating a wire formed using the semi-additive process to establish a high aspect thereof.

The conductor material is not limited to the above Ag paste and only has to be the one including a good conductor such as Ag, Cu, or Au formed by a sputtering method, a vapor deposition method, pressure bonding of a foil, plating, or the like. The forming method for the insulating layer, the opening, and the via hole is not limited to the above and may be a method of forming an opening by a laser or a drilling process after pressure bonding of an insulating material sheet, or application thereof by spin-coating or spraying.

The insulating material is not limited to glass or a ceramic material as above, may be an organic material such as an epoxy resin, a fluorine resin, or a polymer resin, and may be a composite material such as a glass-epoxy resin while it is desirable that the insulating material have a low dielectric constant and a low dielectric loss.

The size of the inductor component is not limited to the above. The forming method for the external electrodes is not limited to the method of applying a plating process to the external conductors exposed by the cutting, and may be a method of further forming, after the cutting, the external electrodes using dipping of a conductor paste, a sputtering method, or the like, and applying a plating process to the external electrodes.

What is claimed is:

1. An inductor component comprising:
a base body that comprises a glass component and a filler;
a coil that is disposed in the base body and is helically wound along an axis, the coil comprising a glass component; and
external electrodes that are disposed in the base body, the external electrodes each being electrically connected to the coil, outer faces of the external electrodes being exposed from the base body, wherein
the base body comprises:
a coil contact part that contacts the coil, the coil contact part being disposed along the coil; and
external electrode contact parts that each individually contact one of the external electrodes on an inner side of the base body, the external electrode contact parts each being individually disposed along one of the external electrodes, wherein
a content rate of the filler of the external electrode contact parts is equal to or larger than a content rate of the filler in the coil contact part,
a content rate of an Si element of the external electrode contact parts is smaller than a content rate of the Si element in the coil contact part,
the base body includes a first end surface and a second end surface facing each other, a first lateral surface and a second lateral surface facing each other, a bottom surface connected between the first end surface and the second end surface and between the first lateral surface and the second lateral surface, and a top surface facing the bottom surface,
one of the external electrodes is buried along the first end surface and the bottom surface, and
the other of the external electrodes is buried along the second end surface and the bottom surface.

2. The inductor component according to claim 1, wherein the external electrodes comprise no glass component.

3. The inductor component according to claim 1, wherein the external electrodes comprise Ag.

* * * * *